United States Patent Office 2,880,230
Patented Mar. 31, 1959

2,880,230

DIAMINE SALTS OF PYROMELLITIC ACID DIESTER

Walter Murray Edwards and Ivan Maxwell Robinson, Wilmington, Del., assignors to E. I. du Pont de Nemours and Company, Wilmington, Del., a corporation of Delaware No Drawing. Application June 13, 1955
Serial No. 515,245
3 Claims. (Cl. 260—475)

This invention relates to a novel class of organic salts, and more particularly to salts which are especially useful in the preparation of polypyromellitimides.

This application is a continuation-in-part of United States application Serial No. 387,038, filed October 19, 1953, now United States Patent 2,710,853, issued June 14, 1955. In the parent case it is disclosed that novel high-molecular-weight polypyromellitimides, derived from a diamine of the group consisting of 4,4-dimethylheptamethylene diamine, nonamethylene diamine, and 3-methylheptamethylene diamine, have a unique combination of desirable physical properties. It is there further disclosed that these polymers are best prepared by dissolving pyromellitic anhydride in an alcohol to form the diacid diester, admixing an equimolar amount of diamine, and heating the resulting salt at polypyromellitimide-forming temperatures. The present application is concerned with these salts as members of a novel class of polypyromellitimide-forming salts.

It has been broadly disclosed in British specification 570,858, accepted July 25, 1945, that linear fiber-forming polymers may be obtained by a process which comprises heating, until the product can be formed into continuous filaments, a mixture of substantially equimolar amounts of a diprimary diamine having a radical length of at least four and a tetracarboxylic acid, such as pyromellitic acid, having two pairs of carboxylic acid groups, the members of each pair being attached to adjacent carbon atoms. The specification also discloses that equivalent amide-forming derivatives of such acids, such as the esters, anhydrides, acid chlorides, amides, or nitriles, may be used instead of the acids themselves.

Polypyromellitimides prepared by the teachings of the aforesaid British patent may manifest a number of attractive properties, such as resistance to heat, moisture, electricity and the like. However, prior to the present invention their usefulness was limited by the fact that it was difficult to control their preparation so as to produce a uniform product, and by the fact that even the best products were relatively intractable.

It is a general object of the present invention to provide a novel class of organic salts. A further object is to provide novel organic salts which are especially useful in the preparation of polypyromellitimides of uniform quality. A more specific object is to provide novel organic salts which are especially useful in the preparation of polypyromellitimides of high tractability. Other objects will be apparent hereinafter.

According to the present invention the aforesaid objects are achieved by novel organic salts consisting essentially of substantially equimolar amounts of (a) a basic component selected from the group consisting of difunctional diprimary diamines and mixtures thereof, and (b) an acidic component selected from the group consisting of temporarily difunctional pyromellitic diacid diesters in which the ester groups are attached to non-adjacent carbon atoms, and mixtures thereof.

Temporarily difunctional pyromellitic diacid diesters in which the ester groups are attached to non-adjacent carbon atoms may be prepared by reacting pyromellitic anhydride in the absence of water with a monofunctional ester-forming compound selected from the group consisting of alcohols and thiols. The term "temporarily difunctional pyromellitic diacid diester" as used herein refers to pyromellitic diacid diesters which can be hydrolyzed at elevated temperatures to yield pyromellitic acid and monofunctional ester-forming compound in mole ratio of 1 to 2, but which may also be dissolved in ethanol/water mixture and titrated at ordinary temperatures to a phenolphthalein end-point with from 1.90 to 2.10 moles of 0.1 N NaOH per mole of dissolved diacid diester.

By the term "monofunctional ester-forming compound" as used herein is meant an organic compound which contains one ester-forming group as the sole functional group. Ordinarily alcohols, and particularly the simple alcohols such as methanol, ethanol, and propanol are preferred for reasons of convenience, economy and ease of handling. However, the choice of ester-forming compound is not critical in the preparation of the polypyromellitimide-forming salts of the present invention, and, in general, any monofunctional ester-forming compound of formula RXH, where R is a monovalent organic radical and X is oxygen or sulfur, may be employed.

The product obtained by reaction of pyromellitic anhydride at moderate temperatures in the absence of water with a monofunctional ester-forming compound of formula RXH is a binary mixture consisting essentially of the asymmetrical diacid diester, having the general configuration

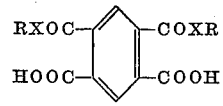

and the symmetrical diacid diester having the general configuration

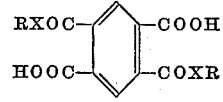

In preparing the salts of the present invention the mixture of isomers may be used as the acidic component, or either isomer may be isolated from the mixture and used alone, although there is no particular advantage in so doing if polymer-grade intermediates are used.

The basic component of the salts of the present invention may consist of one or more difunctional diprimary diamines. By the term "difunctional diprimary diamine" as used herein is meant an organic compound which contains two amino groups, each of which is attached only to carbon, as the sole functional groups thereof. Accordingly, the basic component has the general configuration $H_2NRNH_2$ where R is a divalent organic radical. However, the charactristics of polypyromellitimides prepared from the salts of the present invention may vary markedly with the particular diamine or mixture of diamines employed. Accordingly, choice of basic component will depend to a large extent on the characteristics desired in the polypyromellitimides to be prepared, in accordance with the general considerations set forth below.

In general, diamines whose amino groups are separated by a chain of less than 7 members, or in which the amine groups are attached to carbon atoms which are also members of carbocyclic rings, form homopolypyromellitimides which tend to degrade at temperatures at or below their melting points, although aliphatic diamines having a separatory chain of 6 members are borderline in this respect. Such diamines are primarily useful as components of salts for the production of copolypyromellitimides, to serve as extenders or modifiers where hydrolytic stability is the principal characteristic desired. Examples of diamines of this sort include:

Trimethylene diamine
Tetramethylene diamine
Hexamethylene diamine
2,2-dimethylpropylene diamine
1,1,3-trimethylpropylene diamine
1,1,6,6-tetramethylhexamethylene diamine
3,3-dimethylpentamethylene diamine
3-methylhexamethylene diamine
3-methoxyhexamethylene diamine
2,5-dimethylhexamethylene diamine
2,2,5,5-tetramethylhexamethylene diamine
Meta-phenylene diamine
Bis-(para-aminocyclohexyl)-methane
Bis-(para-aminophenyl) ether Of the diamines whose amino groups are separated by a chain of at least 7 members and are attached to aliphatic carbon, those which contain aromatic carbons as members of a chain of less than 10 aliphatic carbon atoms separating the amino groups tend to yield homopolypyromellitimides which melt above 380° C. Accordingly, these diamines are primarily useful as components of salts for the production of homopolypyromellitimides which are to be fabricated into relatively thin articles in which both high-melting characteristics and hydrolytic stability are desired, or as components of mixed salts for the product of copolypyromellitimides. Examples of diamines of this sort include:

2,4-bis(beta-amino-t-butyl)toluene,
Bis-(para-beta-amino-t-butyl phenyl)ether
Bis-para-(beta-methyl-delta-aminopentyl)-benzene Of the diamines not included in the two preceding groups, in general those which contain hetero atoms joining aliphatic carbon atoms, and most of those which contain tertiary hydrogen atoms attached to aliphatic carbon atoms, other than those alpha to the amino groups, form homopolypyromellitimides which tend to degrade at temperatures above 175° C. in the presence of oxygen, and accordingly these diamines are primarily useful as components of salts for the preparation of homopolypyromellitimides and copolypyromellitimides which are to be used at moderate service temperatures. Examples of diamines within this group include:

Bis-(3-amino propyl)-ether
1,2-bis-(3-aminopropoxy)-ethane
1,2-bis-(3-aminopropoxy)-propane
3-methylheptamethylene diamine
5-methyl nonamethylene diamine Of the diamines not included within the three preceding groups, the straight chain diamines and the diamines which contain carbon atoms which are also members of a carbocyclic ring as members of the chain separating the amino groups, tend to form moderately crystalline homopolypyromellitimides and accordingly are primarily useful as components of salts for the production of crystalline homopolypyromellitimides and copolypyromellitimides. Examples of diamines of this sort include:

Heptamethylene diamine
Octamethylene diamine
Nonamethylene diamine
Decamethylene diamine
9,9-bis-(3-aminopropyl)-fluorene
Bis-para-(1,1-dimethyl-5-aminopentyl)-benzene Of the diamines not included in any of the preceding four groups, those in which the amino groups are separated by a chain of more than 9 carbon atoms tend to form homopolypyromellitimides which melt at temperatures below 300° C., and accordingly are primarily useful as components of salts for the production of copolypyromellitimides or homopolypyromellitimides which are to be used at relatively mild service temperatures. Examples of diamines of this sort include:

2,11-diaminododecane and
2,17-diaminoeicosadecane.

A diamine not included within any of the preceding five groups is 4,4-dimethylheptamethylene diamine. This diamine is especially attractive as a component of salts for the production of homopolypyromellitimides of unusual versatility. It is also valuable as a component of salts for the production of copolypyromellitimides. Among the attractive properties of homopolypyromellitimides prepared from salts of this diamine are high thermal stability in the molten state, melting point of about 320° C., low crystallinity and relatively low melt viscosity, glassy state transition temperature of about 130° C., high oxidative stability, high moisture resistance, high chemical resistance, good electrical properties, good adhesive qualities in the molten state and good antifriction properties in the solid state.

As examples of mixtures of diamines especially suitable as components of salts for the production of copolypyromellitimides which are similar to the homopolypyromellitimide referred to in one of the three immediately preceding groups may be mentioned mixtures of nonamethylene diamine and hexamethylene diamine in mole ratios of 5 to 1, mixtures of bis-(para-aminocyclohexyl)-methane and hexamethylene diamine in 7 to 1 mole ratio, mixtures of nonamethylene diamine and bis-(para-aminocyclohexyl)-methane in mole ratios of 3 to 1, and mixtures of 4,4-dimethylheptamethylene diamine and bis-(para-aminocyclohexyl)-methane in mole ratios of 1 to 2.

The salts of the present invention are conveniently prepared by admixing the basic component to a solution of a substantially equimolar amount of the acidic component in a suitable solvent such as alcohol or alcohol-water mixtures at moderate temperatures. The presence of water in the solvent during the salt-forming step is not ordinarily disadvantageous because the ester groups are relatively stable against hydrolysis at temperatures below about 100° C. For best results in preparing salts for the preparation of polypyromellitimides of uniform quality, however, it is important that the components be brought into homogeneous solution before the salt is isolated or polymerized. By the term "substantially equimolar amounts" as used herein is meant amounts such that the mol percent excess of either component, based on the other, does not exceed about 2.5. Advantageously, the acidic component is used in slight excess, for example, in amounts of from 0.1 to 2.5 mol percent based on the total basic component, to serve as a viscosity regulator and to improve the color of the ultimate polymers. Preferably the formation of the salts of the present invention is conducted in the absence of oxygen.

The salts of the present invention may be converted to polypyromellitimides by heating them at polypyromellitimide-forming temperatures, ordinarily above about 135° C. A preferred procedure involves isolating the salts by evaporation of the solvent at temperatures below about 135° C. and heating the resulting salt in the solid state at temperatures above 135° C. until a partially formed polypyromellitimide is obtained; and thereafter, heating the resulting product either in the solid state or in the molten state until the desired degree of polymerization is reached. In preparing copolypyromellitimides the diamines may be admixed before forming the salt, or the salts may be prepared from the individual diamines and mixed together.

The invention is more fully described and explained by means of the following examples which, however, are not intended to limit the scope of the present invention. In the examples parts and percentages are by weight except as otherwise noted.

*Example I.*—Commercial pyromellitic anhydride is purified by successive recrystallizations from acetic anhydride and dioxane, and dissolved in about four times its weight of refluxing absolute ethanol. The excess ethanol is removed by distillation, leaving a quantitative yield of diacid diester. Successive recrystallizations from acetic acid and 50/50 ethanol/water result in an approximately 50 percent yield of the symmetrical diacid diester, melting at 205 to 232° C., depending on the rate of heating, neutral equivalent 155 vs. 155 theory. On melting, the diacid diester regenerates pyromellitic anhydride and ethanol.

2,11-dodecanediamine, obtained via the reaction of dimethyl cadmium on sebacoyl chloride, is reductively aminated at about 95° C. in methanol solution in the presence of about four times its weight of ammonia, a catalytic amount of Raney nickel, and hydrogen at 500 p.s.i.g., to yield 2,11-dodecanediamine which is purified by fractional distillation, boiling at 84° C./3 min.; neutral equivalent 100 vs. 100 theory.

4.5928 parts of the recrystallized diacid diester and 2.9660 parts of the distilled diamine are admixed in 50/50 ethanol water, under nitrogen, and heated to form a homogeneous solution of the diacid diester/diamine salt. The solution is heated with removal of volatiles to a temperature which increases gradually to 285° C. during 1.5 hours, and the molten residue is further heated at 325° C. for 30 minutes. The resulting product is compression molded at 200° C. to a thin, tough, cold-drawable film. The film is completely soluble in meta-cresol and manifests an inherent viscosity of 0.8.

In comparison, a polymer prepared by a similar polymerization cycle using pyromellitic anhydride and 2,11-dodecanediamine in diethyl ether as an initial solvent forms a brittle film on molding at 220° C. The film is only partially soluble in meta-cresol. A similar brittle, partially insoluble film is obtained from pyromellitic acid and 2,11-dodecanediamine in an initial solvent of ethanol. A brittle product of inherent viscosity about 0.25 is obtained from tetramethyl pyromellitate and 2,11-dodecanediamine. Polymers prepared from pyromellitic diesters obtained by the dissolution of pyromellitic anhydride in alcohol containing substantial amounts of water, so as to have a neutralization equivalent differing by as much as 5% from the theoretical and 2-11-dodecanediamine, also form films containing cresol-insoluble material.

*Example II.*—Pyromellitic anhydride obtained by the sublimation of recrystallized commercial pyromellitic acid is dissolved in refluxing absolute methanol, and the excess alcohol is removed by evaporation leaving a quantative yield of diacid diester having a neutral equivalent of 141 vs. 141 theory.

Equimolar amounts of this diacid diester and 2,11-dodecanediamine prepared as in Example I are dissolved in methanol to form a homogeneous solution of the diacid/diester salt. The solution is further heated under the conditions of Example I to obtain a product which is compression molded at 200° C. to yield a thin, tough cold-drawable film which is completely soluble in meta-cresol and manifests in inherent viscosity of 0.6.

*Example III.*—A known molar amount of pyromellitic anhydride obtained as in Example II is dissolved in about 5 times its weight of absolute ethanol. The resulting solution is cooled in an ice bath and 4,4-dimethylheptamethylene diamine in amount equivalent to the anhydride dissolved is slowly added with stirring. Upon further cooling the diacid diester/diamine salt precipitates. The salt is filtered off and dried under vacuum. The dry salt is heated at 145° C. for 1.5 hours, during which time it remains in the solid state, and then pressed between hot platens at 340° C. for two minutes. The product is a thin tough film which is completely soluble in meto-cresol and manifests an inherent viscosity of 0.7, determined at 0.5 concentration in meta-cresol.

In comparison, a polymer prepared from pyromellitic acid and 4,4-dimethylheptamethylene diamine by a similar procedure, wherein the acid is dissolved in ethanol, the diamine added, the mixture homogenized, the ethanol evaporated, and the residue heated under the aforesaid polymerization condition, contains cresol-insoluble material and requires a higher temperature to press into film.

On the other hand, a polymer prepared from the asymmetrical diacid diester, obtained by dissolving the anhydride in absolute ethanol, fractionally crystallizing out the symmetrical diacid diester, and evaporating the alcohol from the molten liquor to recover the asymmetrical diacid diester, is similar in all respects to the polymers obtained from either the mixed diacid diesters, or the symmetrical diacid diester.

*Example IV.*—A series of salts are made using various basic components and an acidic component obtained by dissolving pyromellitic anhydride in refluxing absolute alcohol and evaporating the excess alcohol. The acidic component has a neutralization equivalent of 155±1. The salts are made by dissolving substantially equimolar amounts of the acidic component and the basic component in a homogenizing solvent of ethanol and water. Subsequently the salts are polymerized by heating at temperatures above 138° C., ordinarily in the range of 138 to 200° C., until substantially all of the volatile condensation products are removed. Thereafter, the approximate melting point of the product is determined and films are pressed from those which are relatively stable in the molten state.

Each of the diamines specifically mentioned in the foregoing discussion is used as a basic component with results as already indicated.

*Example V.*—A series of copolymers is made by mixing diacid diester/diamine salts, prepared as in Example IV, in a flux of water, heating to homogenize, and polymerizing as in Example IV. Each of the copolymers specifically mentioned in the foregoing discussion is prepared in this way with results as already indicated. In addition, a multicomponent copolymer is made in the same way by admixing equimolar amounts of the diacid diester salts of each of the following diamines:

tetramethylenediamine
Hexamethylenediamine
Nonamethylenediamine
Decamethylenediamine
1,1,6,6-tetramethylenediamine
4,4-dimethylheptamethylenediamine
Para-phenylenediamine The product molds at 300° C. to form a tough moderately crystalline film.

*Example VI.*—A diacid diester salt is prepared from the equimolar amounts of acidic component of Example IV and a basic component consisting of a mixture of tetramethylenediamine, hexamethylenediamine, nonamethylenediamine and decamethylenediamine in mole ratio of 20:20:30:30 respectively. The procedure of Example III is used in preparing the salt and polymer therefrom. The product compression molds at 340° C. to form a tough film.

We claim.

1. A diamine salt of a pyromellitic diester, having esterfied carboxyls on non-adjacent carbon atoms, said diamine having the formula $NH_2RNH_2$ wherein R is an alkylene group with its terminal valence bonds separated by a chain of from 7 to 10 carbon atoms, the quantities of diamine and diester components in said salt being substantially equimolar.

2. Composition of claim 1 wherein said diamine is 2,11-dodecane-diamine.

3. Composition of claim 1 wherein said diamine is 4,4-dimethylheptamethylene-diamine.

References Cited in the file of this patent

UNITED STATES PATENTS 2,710,853    Edwards et al. _____ June 14, 1955

FOREIGN PATENTS 570,858    Great Britain _____ July 25, 1945